United States Patent
Alguera Gallego et al.

(10) Patent No.: US 6,802,535 B1
(45) Date of Patent: Oct. 12, 2004

(54) SUPPORT DEVICE

(75) Inventors: José Manuel Alguera Gallego, Aschaffenburg (DE); Gerald Muller, Obertshausen (DE); Steffen Pfister, Langen (DE)

(73) Assignee: Jost-Werke GmbH & Co. KG, Frankfurt am Main (DE)

( * ) Notice: Subject to any disclaimer, the term of this patent is extended or adjusted under 35 U.S.C. 154(b) by 63 days.

(21) Appl. No.: 10/130,888

(22) PCT Filed: Nov. 23, 2000

(86) PCT No.: PCT/EP00/11665

§ 371 (c)(1),
(2), (4) Date: Aug. 21, 2002

(87) PCT Pub. No.: WO01/40036

PCT Pub. Date: Jun. 7, 2001

(30) Foreign Application Priority Data

Nov. 27, 1999 (DE) .......................... 199 57 239

(51) Int. Cl.[7] ................................................ B60S 9/02
(52) U.S. Cl. ............................... 280/763.1; 280/423.1; 428/188.8
(58) Field of Search .............................. 248/677, 188.1, 248/188.8, 188.9, 695, 615; 280/763.1, 423.1, 475

(56) References Cited

U.S. PATENT DOCUMENTS

| | | | | |
|---|---|---|---|---|
| 3,666,290 A | * | 5/1972 | Dalton et al. ............ | 280/763.1 |
| 3,751,067 A | | 8/1973 | Claflin et al. | |
| 3,920,094 A | * | 11/1975 | Claflin .................... | 280/763.1 |
| 3,989,276 A | | 11/1976 | Hamerl | |
| RE31,011 E | * | 8/1982 | Belke ...................... | 280/763.1 |
| 4,462,612 A | * | 7/1984 | Dreyer et al. ............ | 280/766.1 |
| 4,634,144 A | * | 1/1987 | Ringe ...................... | 280/763.1 |
| 4,824,136 A | * | 4/1989 | Baxter ...................... | 280/475 |
| 4,903,977 A | * | 2/1990 | Baxter ...................... | 280/475 |
| 5,054,805 A | * | 10/1991 | Hungerink et al. ......... | 280/475 |
| 6,231,081 B1 | * | 5/2001 | Berke et al. ............. | 280/763.1 |
| 6,513,783 B1 | * | 2/2003 | Alguera Gallego et al. | 248/677 |
| 2003/0168648 A1 | * | 9/2003 | Alguera Gallego et al. | 254/419 |

FOREIGN PATENT DOCUMENTS

| | | | | |
|---|---|---|---|---|
| DE | 31 19 359 | | 12/1982 | |
| DE | 33 06 789 | | 8/1984 | |
| DE | 3306789 A | * | 8/1984 | ............ B60P/3/32 |
| EP | 322 634 | | 7/1989 | |
| EP | 322634 A | * | 7/1989 | ............ B60S/9/04 |
| EP | 430 643 | | 6/1991 | |

* cited by examiner

*Primary Examiner*—Brian L. Johnson
*Assistant Examiner*—Kelly E Campbell
(74) *Attorney, Agent, or Firm*—Hudak, Shunk & Farine, Co LPA

(57) ABSTRACT

The invention relates to a support device for semi-trailers comprising a leg which has a receiving device, on its lower end. The support leg has a base element with a base plate, which is mounted by means of two vertical plates on the base receiving device so that it can move vertically and can pivot. Between the base plate and the base receiving device there is a damping element. To achieve an improved pivoting capability of the support base, whereby the damping element is subjected to a small deformation, the damping element is located on the underside of the base receiving device so that cannot pivot, and is supported on a curved plate which is fixed to the base plate and the contour of which is adapted to the pivoting movement of the base plate in relation to the supporting leg.

19 Claims, 4 Drawing Sheets

SUPPORT DEVICE

FIELD OF THE INVENTION

This invention relates to a support device for semi-trailer with a support leg, on the lower end of which a base receiving device is located, and with a support base with a base plate, which is mounted by means of two vertical plates on the base receiving device so that it can move in the vertical direction and can pivot, and with at least one damping element located between the base plate and the base receiving device.

BACKGROUND OF THE INVENTION

Support devices are generally located in pairs on the underside of semi-trailers in their forward areas, and are always used when the semi-trailer is separated from its tractor and is parked by itself. In systems of the prior art, on semi-trailers with air springs, air will almost inevitably have escaped from the springs after the semi-trailer has been parked for a more or less long period of time, as a result of which the rear portion of the semi-trailer droops and the semi-trailer assumes a diagonal position or a position in which it tilts toward the rear in relation to the ground. For this purpose, the support bases or their base plates must be able to swivel, to compensate for this inclined position. The same requirement applies if the semi-trailer is parked on ground that is uneven or not level. In addition to the pivoting capability of the base or of the base plate, it is desirable that, as the support devices are being extended, the movable parts of the support device come to rest gently on the ground so that they are not damaged. For this purpose, corresponding damping elements are located in the support bases.

Because it is very difficult to satisfy all these peripheral requirements with only one model of the base, the general practice is to install different model bases as a function of the conditions in which they will be used.

The required model must generally be defined prior to the purchase of the support winch, because the support base is a component of the winch, and must accordingly be mounted on it.

The different realization of the base generally also requires different arrangements and preparatory steps on the support winch itself. Consequently, there is a specific model of support winch for each type of base. This has the advantage that the base and the support winch can be optimally coordinated with each other, although that, too, has several disadvantages.

For example, during the process of manufacturing the support winch, a great many different manufacturing operations have to be performed for each model, which entails a correspondingly high cost for tools, jigs, inventories of material, space and logistics. Moreover, once the support winch has been manufactured, it is generally no longer possible for the final consumer or the retail dealer to exchange different base models for one another.

It is therefore desirable to develop different model bases that can be used in as many applications as possible, and accordingly have a wide range of potential applications.

The prior art includes one model of a foot which is essentially a rigid structure which has a plate-shaped ground contact surface and can pivot around an axle which is mounted horizontally in the inner tube of the support winch, transverse to the direction of travel. The support foot can adapt to certain inclinations of the road, e.g. entrance ramps, hills and similar inclinations, and can thus be used to park the semi-trailer.

As a result of the inherently rigid realization of the support base, however, impact loads of the type that occur, for example, during the shunting of the semi-trailer, are transmitted directly to the support winch and indirectly to the vehicle. Ultimately, these impacts can lead to disruptions in operation or even damage to both the winch and the vehicle.

To reduce such damage or to eliminate it altogether, there are models of bases that have elastic elements that absorb the kinematic energy of the impact and can thus protect the mechanical components.

DE 31 19 359 A1 discloses a support device in which, on the lower end of the support part to be deployed, there is a ground plate that projects laterally beyond this support part, whereby between this ground plate and the base plate there is an elastic pressure body which is designated the damping element and is made of rubber. A retaining ring that is welded to the base plate has an upper peripheral segment that overlaps and grips the laterally projecting ring-shaped portion of the ground plate, whereby there is a certain amount of play between the retaining ring and the extendable support part. The pivot angle and the deflection travel of the base plate are limited by the compressibility of the elastic pressure body and the distance between the retaining ring and the extendable support part. In this support device there is no pivot bearing. This design gives the base plate only a limited ability to adapt to major uneven spots in the ground, whereby the damping element is deformed both when the base is set down in the vertical direction, as well as when the base is tipped.

EP 0 430 643 A2 discloses a support base, in which the fastening to the base receiving device is identical with the pivot bearing of the base. A tubular bearing element is located in a rectangular housing of the base retaining device and is held so that it can move vertically in slots in two vertical plates that are fastened to the base plate. Between the housing and the base plate there is a damping element which is compressed when the base is set down. An additional deformation in the transverse direction occurs when the base pivots, as a result of which the housing must be pushed over the damping element. This arrangement has a number of disadvantages.

The damping element Is exposed to significant and different loads, which leads to rapid material fatigue. The pivoting process is prevented and limited by the damping element. When the support base Is retracted, it remains in its pivoted position, because the damping element prevents it from pivoting back into its initial position. When the support base is lowered again, the damping element can interfere with the free movement of the base and damage it.

U.S. Pat. No. 3,666,290 describes a support base in which there are two damping elements between a plate attached to the end surface of the support tube and the base plate. Above the damping element, there is a pivot bearing which consists of a bolt inserted through the support tube, which Is oriented so that it can move in two slots of two vertical plates fastened to the base plate. In this arrangement of the support base, too, the damping elements are additionally deformed during pivoting, as a result of which the pivot angle is limited.

SUMMARY OF THE INVENTION

Starting from the prior art as described in U.S. Pat. No. 3,666,290, the object of the invention is to create a support device with a support base which has an improved pivoting capability, whereby an additional object is to subject the damping element to reduced deformation.

The invention teaches that this object is achieved with a support device in which the damping element is located so that it cannot pivot on the underside of the base receiving device and is supported on a curved plate which is fastened to the base plate, whereby the contour of the curved plate is adapted to the pivoting movement of the base plate with reference to the support leg.

As a result of stationary location of the damping element on the underside of the base receiving device, the damping element does not accompany the pivoting movement of the base when the latter pivots. The damping element is therefore compressed only in the vertical direction in every pivot position. The curved plate guarantees that the damping element can be optimally supported in any pivot position.

The damping element can be fastened to the underside of the base receiving device or, in one preferred embodiment, can be fastened to the pivot bearing device by means of a holding device.

The holding device, which can consist of two oblong retaining plates, is located in the pivot bearing device so that it can move vertically, so that when a load is applied it can move upward until it comes in contact with a stop, whereby the damping element is compressed. The stop can be formed by slots, for example, in which the bolts of the pivot bearing device move in the vertical direction.

So that the damping element remains stationary below the base receiving device, in particular in the embodiment that has two retaining plates, at least one stabilizer toe is located on the base receiving device which is engaged on the damping element.

The damping element preferably consists of a roller made of elastic material. A roller offers the advantage that the contact surface on the relatively small compared with plate-shaped damping elements, so that if the roller is mounted so that it cannot rotate, only small friction forces occur during pivoting, which means that when the base is raised, it can pivot back into its starting position.

This process is facilitated if, as in an additional embodiment, the roller is rotationally fastened in the holding device. As a result, the material of the roller is protected even during pivoting, because the roller can roll along the surface of the curved plate during a pivoting movement.

The longitudinal axis of the roller is preferably oriented parallel to the pivoting axis of the support base.

The curved plate preferably has a concave surface on the side facing the damping element.

The support device offers the advantage that the wear on the damping element is low. The pivot angle of the support base is far larger than on support bases of the prior art that have a damping element, because the damping element does not restrict or interfere with the pivot process. As a result of the pivoting fastening of the support base in the pivot bearing device on the support base, a stable arrangement is created, so that even transverse forces can be absorbed safely.

BRIEF DESCRIPTION OF THE DRAWINGS

Advantageous realizations of the invention are described in greater detail below with reference to the exemplary embodiments illustrated in the accompanying drawings, in which.

DETAILED DESCRIPTION OF THE INVENTION

Figure 1:
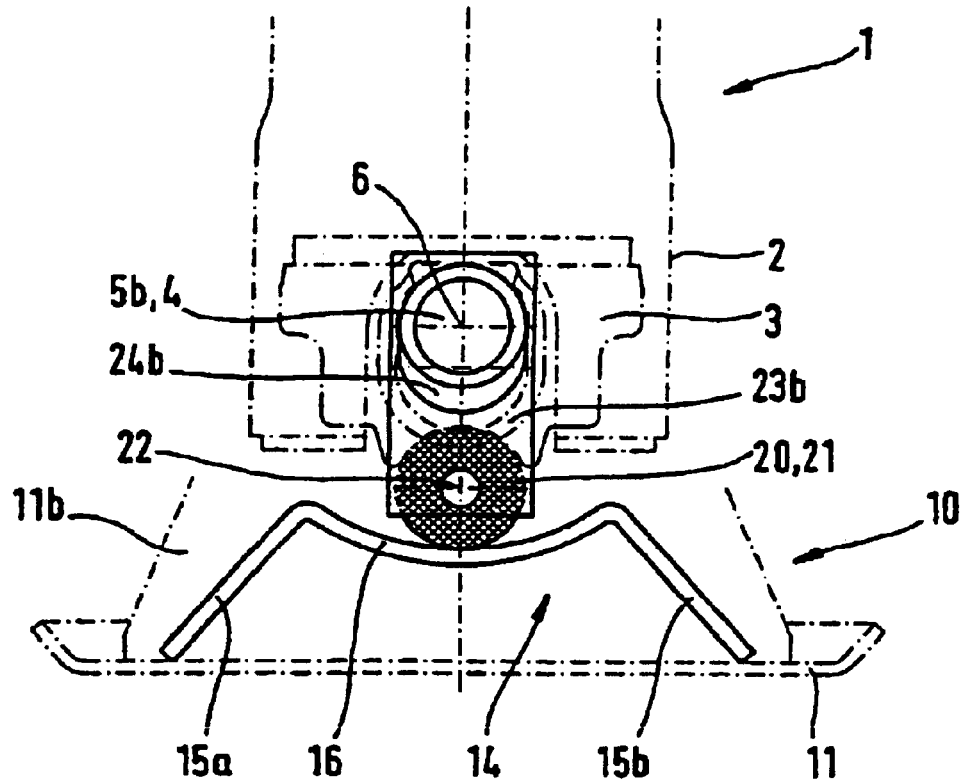
FIG. 1 shows a side view of the support device with the support base.
Figure 2:
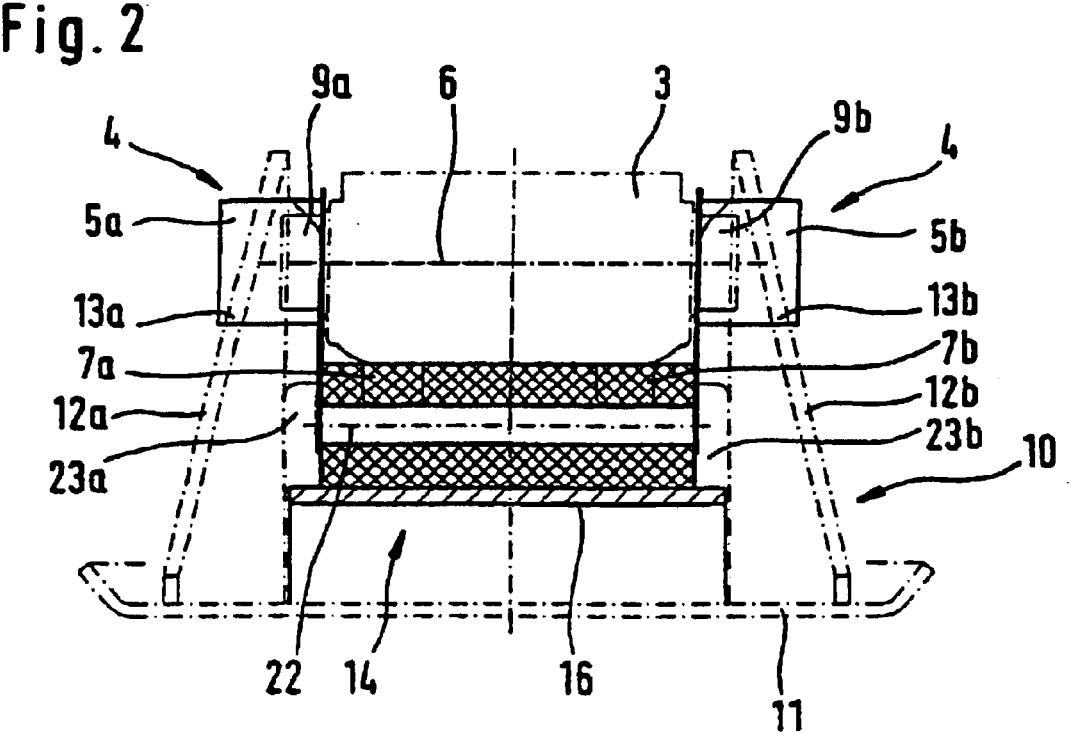
FIG. 2 is another side view of the support base system illustrated in FIG. 1, with no load.

FIGS. 1 and 2 are schematic illustrations of the lower end of a support leg 1, whereby only the telescoping support 2 is visible, to the lower end of which a base receiving device 3 is fastened. The configuration of the base receiving device, as shown in FIG. 2, shows two journals 9a, b on the sides with two bolts 5a, b to form a pivot bearing device 4, on which the support base 10 is pivotably mounted.

The support base 10 has a base plate 11 on which there are two vertical plates 12a, b, which in the embodiment illustrated here are in a slightly inclined position. In the vicinity of the pivot bearing device 4, each of the vertical plates has slots 13a, b, the longitudinal axes of which are oriented vertically.

On the underside of the base receiving device 3 there is a damping element 20 in the form of a cylindrical roller. This damping element can be fastened to the underside of the base receiving device, although it is also possible to install this damping element by means of a holding device in the form of two holding plates 23a, b so that it stationary, i.e. so that it does not pivot, below the base receiving device 3. The two oblong retaining plates 23a, b likewise have slots 24a, b, so that when a load is applied to the support leg 1, the retaining plates 23a, b can move relative to the pivot bearing device 4.

In the embodiment shown here, the holding plates 23a, b can move around the pivoting axis 6, although that is something that should preferably be prevented. For this purpose, on the underside of the base receiving deice 3 there are four stabilizer toes, of which only two 7a, b are shown concealed. These toes surround the elastic material of the roller 21 from above, so that the roller 21, under load, is held so that It cannot slip out from under the base retaining device 3. The longitudinal axis 22 of the damping element 20 lies below and parallel to the pivoting axis 6 of the pivot bearing device.

Figure 5:
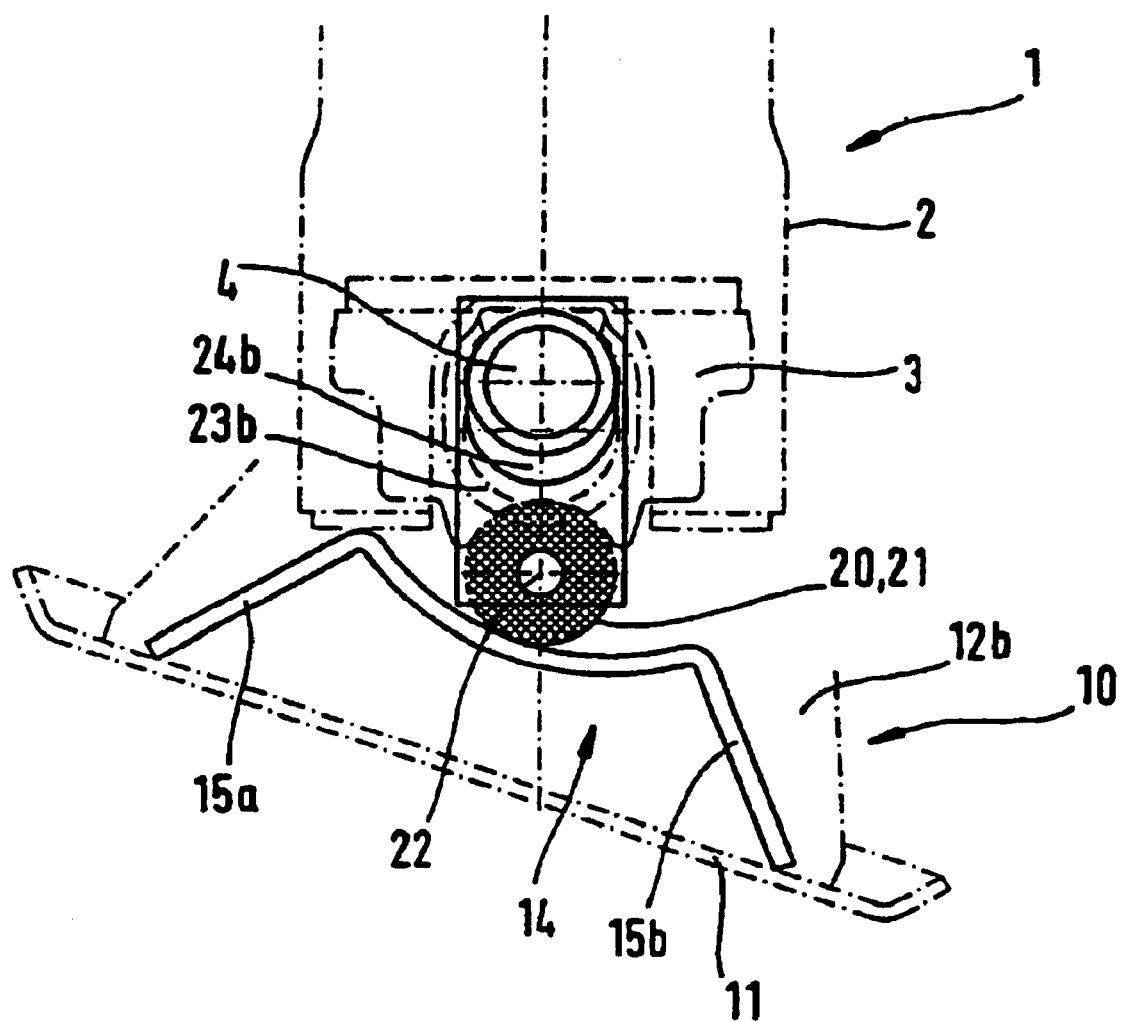
FIG. 5 is a side view as in FIG. 1 of the support base system with a pivoted support base.

The damping element 20 is supported on a curved plate 14 which has two diagonal side pieces 15a, b which are fastened to the base plate 11. Between the two side pieces 15a, b there is a concave middle piece on which the roller 21 rests. The radius of curvature of this concave middle piece is approximately equal to the distance between the pivot bearing axis 6 and the surface of the concave middle piece 16. This arrangement guarantees that even when the base 10 pivots, as shown in FIG. 5, the damping element 20 always rests in the optimal position on the concave middle piece, and under a load the damping element is deformed only in the vertical direction.

The stabilizer toes 7a, b can be eliminated if the two retaining plates 23a, b are block to prevent pivoting in the vicinity of the pivot bearing device. In that case, the damping element 20 can be rotationally located in the retaining plates 23a, b, so that in the event a pivoting of the support foot 10, the roller 21 can roll on the upper side of the curved plate 14.

Figure 3:
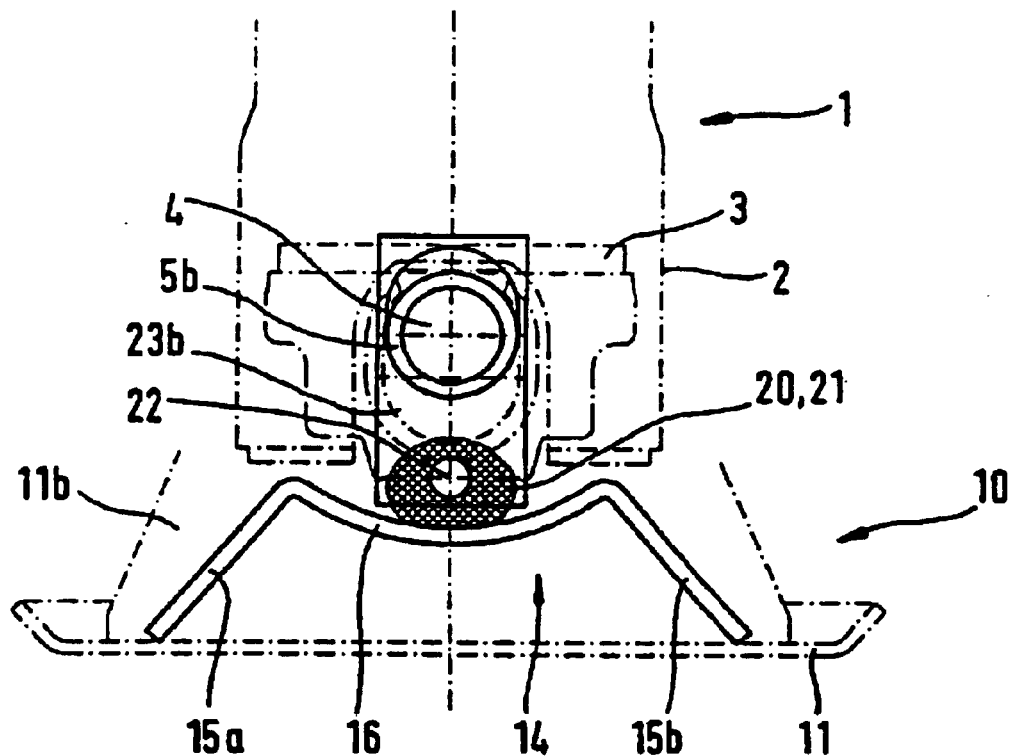
FIGS. 3 and 4 show the support device illustrated in FIGS. 1 and 2 under load.
Figure 4:
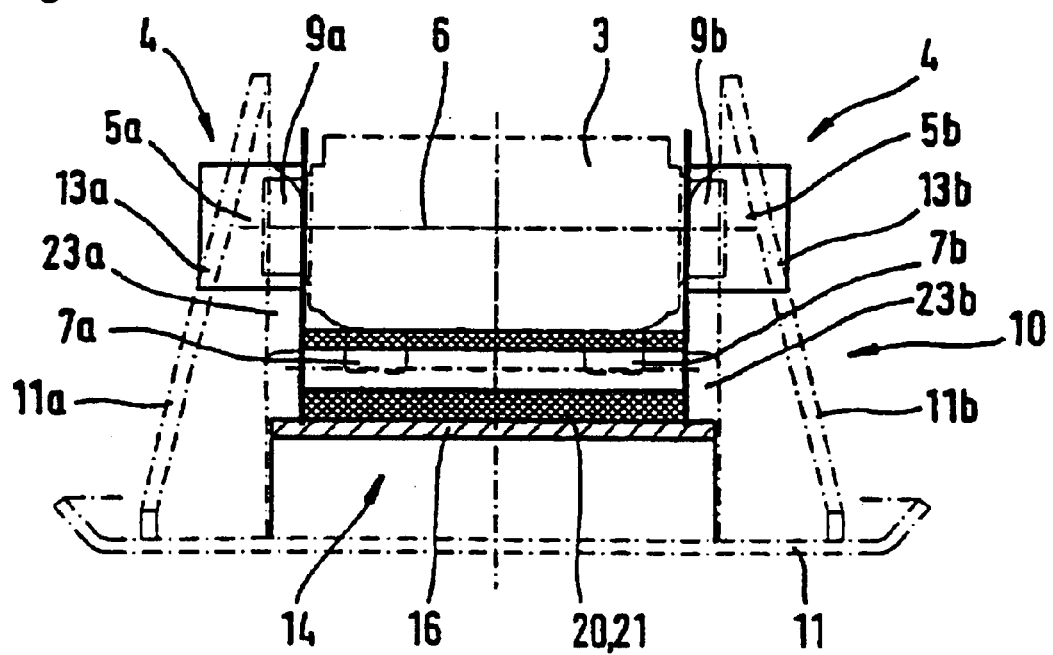

FIGS. 3 and 4 show the loaded condition after the lowering of the support leg 1. Both the lateral plates 11a, b and the retaining plates 23a, b move upward relative to the support tube 2, as a result of which the support base 10 comes closer to base receiving device 3. The damping element 20 is thereby compressed and thus cushions the support process.

Figure 6:
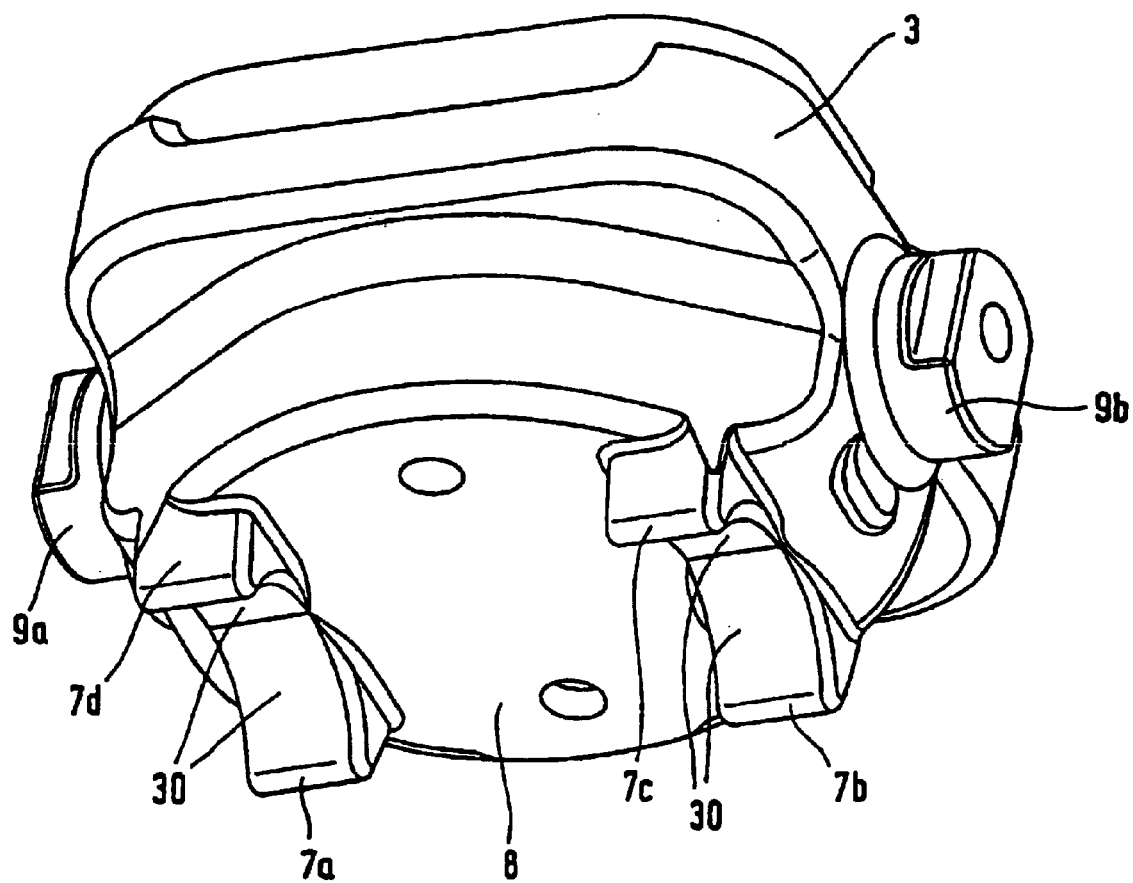
FIG. 6 is a view in perspective of the base receiving device.

FIG. 6 is a perspective view of the base receiving device 3 from below. On the bottom wall 8 there are four stabilizer toes 7a–d. Each toe 7a–d has a curved surface 30 facing downward, which is in contact with the damping element 20. The curvature of the surface 30 is adapted to the cylindrical shape of the roller 21. Each two toes 7a, d and 7b, c surround the roller 21 in pairs and thus prevent any lateral movement of the damping element 20.

What is claimed is:

1. A support device for semi-trailers with a support leg, comprising: a base receiving device adapted to be connected to a lower end of a support leg, and a support base with a base plate, which is mounted by means of two vertical plates on the base receiving device so that the support base can move in a vertical direction and pivot, and with at least one damping element located between the base plate and the base receiving device, wherein the damping element is located so that it cannot pivot on an underside of the base receiving device and is supported on a curved plate which is fastened to the base plate and which has a concave surface on a side facing the damping element.

2. A support device according to claim 1, wherein the damping element is fastened to the underside of the base receiving device.

3. A support device according to claim 1, wherein the damping element is fastened to a pivot bearing device by means of a holding device.

4. A support device according to claim 3, wherein the holding device is located in the pivot bearing device so that the holding device can move in the vertical direction.

5. A support device according to claim 4, wherein the damping element is a roller made of elastic material.

6. A support device according to claim 5, wherein the longitudinal axis of the roller is oriented parallel to a pivoting axis of the support base.

7. A support device according to claim 5, wherein located on the underside of the base receiving device is at least one stabilizer toe which is engaged with the damping element.

8. A support device according to claim 1, wherein the damping element is a roller made of elastic material.

9. A support device according to claim 8, wherein the longitudinal axis of the roller is oriented parallel to a pivoting axis of the support base.

10. A support device according to claim 9, wherein the roller is in contact with the underside of the base receiving device.

11. A support device according to claim 10, wherein the roller is rotationally fastened in the holding device.

12. A support device according to claim 11, wherein located on the underside of the base receiving device is at least one stabilizer toe which is engaged with the damping element.

13. A support device according to claim 10, wherein located on the underside of the base receiving device is at least one stabilizer toe which is engaged with the damping element.

14. A support device according to claim 9, wherein located on the underside of the base receiving device is at least one stabilizer toe which is engaged with the damping element.

15. A support device according to claim 8, wherein the roller is in contact with the underside of the base receiving device.

16. A support device according to claim 8, wherein the roller is rotationally fastened in the holding device.

17. A support device according to claim 16, wherein located on the underside of the base receiving device is at least one stabilizer toe which is engaged with the damping element.

18. A support device according to claim 8, wherein located on the underside of the base receiving device is at least one stabilizer toe which is engaged with the damping element.

19. A support device according to claim 1, wherein located on the underside of the base receiving device is at least one stabilizer toe which is engaged with the damping element.

* * * * *